Jan. 1, 1952

R. H. GODDARD 2,580,908

CYLINDRICAL ROTATING VALVE MECHANISM
FOR MUTIPLE RESONANCE CHAMBERS
Filed Oct. 2, 1947

Inventor.
Robert H. Goddard, Dec'd.
Esther C. Goddard, Executrix.
BY Chas. T. Hawley
ATTORNEY.

Patented Jan. 1, 1952

2,580,908

UNITED STATES PATENT OFFICE 2,580,908

CYLINDRICAL ROTATING VALVE MECHANISM FOR MULTIPLE RESONANCE CHAMBERS

Robert H. Goddard, deceased, late of Annapolis, Md., by Esther C. Goddard, executrix, Worcester, Mass., assignor of one-half to The Daniel and Florence Guggenheim Foundation, New York, N. Y., a corporation of New York Application October 2, 1947, Serial No. 777,468

3 Claims. (Cl. 60—35.6)

This invention relates to air-craft propulsion apparatus in which a series of resonance chambers are arranged in a fixed circumferential series about the longitudinal axis of a rocket craft.

It is the general object of this invention to provide a simple and efficient valve mechanism for such a series of chambers, by which both the timing and the order of firing is determined and controlled.

More specifically, a single cylindrical rotating valve member is provided to control the air admission to an entire circumferential series of resonance chambers, each of which chambers has a short radially disposed intermediate portion through which said cylindrical valve member functions.

The invention further relates to arrangements and combinations of parts which will be hereinafter described and more particularly pointed out in the appended claims.

Preferred forms of the invention are shown in the drawing, in which

Figure 1:
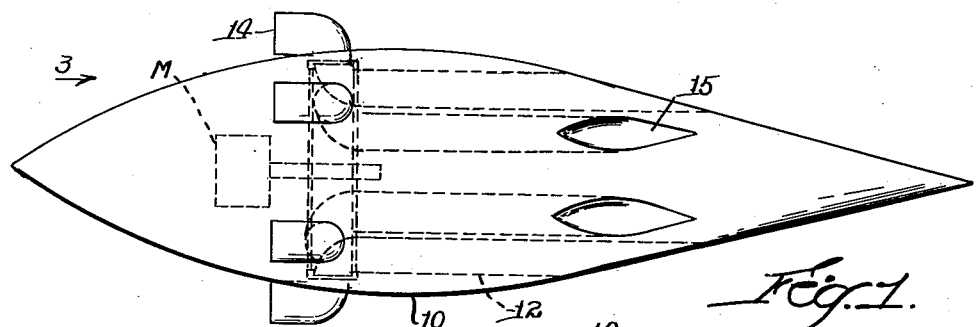
Fig. 1 is a plan view of an aircraft embodying this invention.
Figure 3:
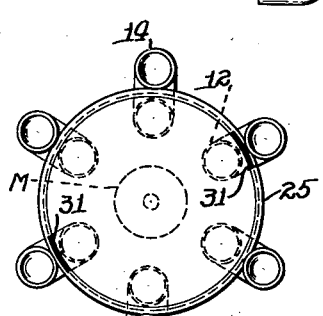
Fig. 3 is a front elevation, looking in the direction of the arrow 3 in Fig. 1.
Figure 2:
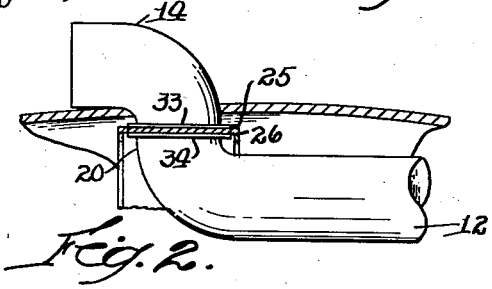
Fig. 2 is an enlarged detail sectional view showing certain parts appearing in Fig. 1.

Referring particularly to Figs. 1, 2 and 3, an aircraft 10 is provided with a plurality of resonance chambers 12 each having an intake pipe 14 and a discharge outlet or nozzle portion 15.

Suitable fuel feed and ignition devices are provided for each chamber 12, as shown for instance in prior Goddard Patent No. 2,395,403, issued February 26, 1946.

These resonance chambers are arranged in a circumferential series within the aircraft 10 and the intake pipes 14 are similarly arranged in a circumferential series about the periphery of the craft 10.

Each resonance chamber 12 and its associated intake pipe 14 are connected by a short offset intermediate portion or conduit 20, which preferably extends inward substantially radially and which is severed to permit passage of a cylindrical valve member 25.

Figure 6:
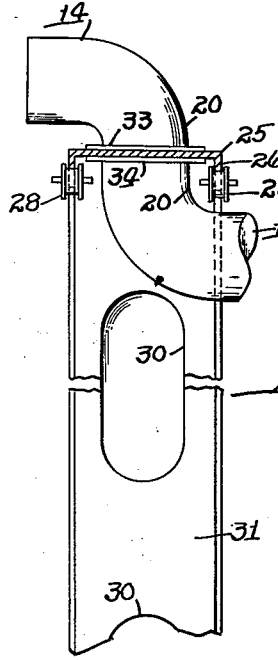
Fig. 6 is a partial sectional side elevation similar to Fig. 2 but showing additional structure.

The member 25 is preferably provided with internal edge flanges 26 for increased rigidity and these flanges may be supported on spaced anti-friction rollers 28, as shown in Fig. 6.

The cylindrical valve member is provided with elongated slots or circumferential openings 30 (Fig. 6) and with intervening closed portions 31. The adjacent severed ends of the intermediate offset connecting portion 20 are preferably provided with laterally extending flanges 33 and 34 to reduce transverse leakage past the valve member 25. The cylindrical valve member rotates with slight clearance with respect to these flanges 33 and 34.

The valve openings 30 and closed portions 31 of the cylindrical valve member 25 may be variably arranged to produce different desired firing orders.

With the arrangement shown in Fig. 2, two closed portions 31 are provided which are diametrically opposite and which successively close the resonance chambers in opposite pairs for firing.

Figure 4:
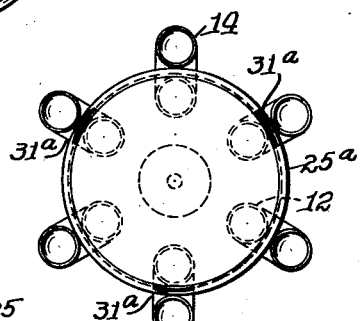
Figs. 4 and 5 are views similar to Fig. 3 but showing modified constructions.

With the arrangement shown in Fig. 4, three closed portions 31a are equally spaced about the valve member 25a, so that the chambers are fired in alternate groups of three each.

Figure 5:
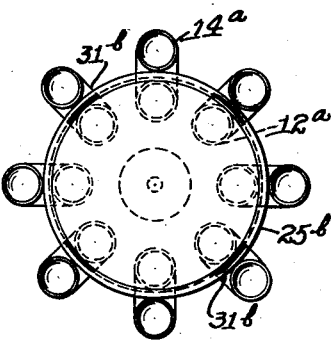

In the construction shown in Fig. 5, eight resonance chambers 12a and eight intake pipes 14a are provided and the cylindrical valve member 25b has four closed portions 31b equally spaced and disposed in opposite pairs. With this construction, the resonance chambers are fired in alternately disposed groups of four chambers each.

In each case, the cylindrical valve member 25, 25a or 25b is continuously rotated by a motor M (Fig. 1) or in any other convenient manner.

As the cylindrical valve members rotate at considerable speed, an objectionable gyroscopic effect may be produced which would interfere with the steering of the aircraft.

Figure 7:
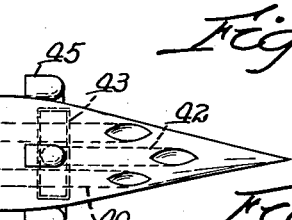
Fig. 7 is a plan view of an aircraft embodying a modified arrangement of resonance chambers.
Figure 8:
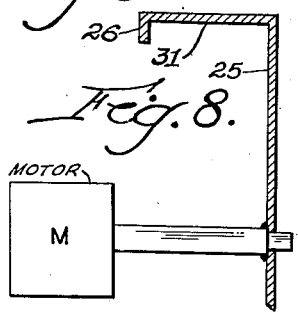
Fig. 8 is a sectional elevation showing the valve-rotating structure.

To offset such a gyroscopic effect, the construction shown in Fig. 7 may be adopted, in which one set of resonance chambers 40 is controlled by a cylindrical valve member 41 rotating in one direction, and a second set of resonance chambers 42 is controlled by a second cylindrical valve member 43 rotating in the opposite direction and preferably at the same speed. The resonance chambers 40 and 42 are provided with intake pipes 44 and 45 and operate as previously described.

The details of construction and method of operation of the resonance chambers in themselves form no part of the present invention, it being merely necessary to state that air is admitted briefly to each chamber for rinsing and fresh charging as a valve port 30 crosses the associated connecting portion 20.

For further details of the construction and operation of such resonance chambers, reference may be made to the prior Goddard Patent No. 1,980,266.

Having thus described the invention and the advantages thereof, it will be understood that the invention is not to be limited to the details herein disclosed, otherwise than as set forth in the claims, but what is claimed is:

1. In aircraft propulsion apparatus, a casing enclosing an internal circumferential series of fixed resonance chambers parallel to the casing axis and each having an intake pipe external to said casing and parallel to the casing axis and at a substantially greater radial distance from said axis than the associated resonance chamber and having a short and substantially radially-disposed intermediate connecting conduit, a single cylindrical valve member crossing all of said intermediate conduits and having circumferentially spaced port openings and intervening closed portions, and means to continuously rotate said valve member.

2. The combination in propulsion apparatus as set forth in claim 1, in which the cylindrical valve is provided with internal edge flanges and in which supporting guide-rolls are provided for said flanges.

3. In propulsion apparatus, a plurality of resonance chambers arranged in two internal fixed circumferential series, each chamber having an external intake pipe and a short radially-disposed intermediate connecting portion, a separate cylindrical valve member crossing all of the intermediate connecting portions of each series and each valve member having spaced port openings and intervening closed portions, and means to continuously rotate said valve members at equal speeds but in opposite directions.

ESTHER C. GODDARD.

*Executrix of the Last Will and Testament of Robert H. Goddard, Deceased.*

REFERENCES CITED

The following references are of record in the file of this patent:

UNITED STATES PATENTS

| Number | Name | Date |
|---|---|---|
| 978,044 | Loftus | Dec. 6, 1910 |

FOREIGN PATENTS

| Number | Country | Date |
|---|---|---|
| 409,068 | France | Feb. 9, 1910 |
| 735,857 | France | Sept. 6, 1932 |
| 452,297 | Great Britain | Aug. 20, 1936 |
| 387,166 | Germany | Dec. 21, 1923 |